US012793229B2

(12) United States Patent
Zhang et al.

(10) Patent No.: US 12,793,229 B2
(45) Date of Patent: Nov. 10, 2026

(54) BUILDING METHOD OF MULTI-MODAL THREE-DIMENSIONAL MEDICAL IMAGE SEGMENTATION AND REGISTRATION MODEL, AND APPLICATION THEREOF

(71) Applicant: Huazhong University of science and technology, Wuhan (CN)

(72) Inventors: Xuming Zhang, Wuhan (CN); Mingwei Wen, Wuhan (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 211 days.

(21) Appl. No.: 18/782,170

(22) Filed: Jul. 24, 2024

(65) Prior Publication Data

US 2025/0238932 A1 Jul. 24, 2025

(30) Foreign Application Priority Data

Jan. 24, 2024 (CN) ......................... 202410099911.8

(51) Int. Cl.
*G06T 7/174* (2017.01)
*G06T 7/11* (2017.01)
*G06T 7/33* (2017.01)

(52) U.S. Cl.
CPC ................ *G06T 7/174* (2017.01); *G06T 7/11* (2017.01); *G06T 7/33* (2017.01); *G06T 2200/04* (2013.01);
(Continued)

(58) Field of Classification Search
CPC ............. G06T 7/174; G06T 7/11; G06T 7/33; G06T 7/337; G06T 2200/04; G06T 2207/20081;
(Continued)

(56) References Cited

U.S. PATENT DOCUMENTS 11,348,259 B2 * 5/2022 Liu .......................... G06T 7/11
2016/0217567 A1 * 7/2016 Keuchel .................... G06T 7/11
2020/0258235 A1 * 8/2020 Lu ........................ G06T 7/0012
(Continued)

*Primary Examiner* — John B Strege

(74) *Attorney, Agent, or Firm* — HSML P.C.

(57) ABSTRACT

The present invention belongs to the field of medical image registration, and more specifically, relates to a building method of a multi-modal three-dimensional medical image segmentation and registration model, and an application thereof. The method includes: acquiring medical images of two modalities of each target, and respectively using the images as a reference image and a floating image to acquire a training sample; and using the training sample to simultaneously optimize three network parameters, so as to acquire a segmentation and registration model formed by a reference image segmentation model, a floating image segmentation model, and a registration model. The reference image and floating image segmentation models are respectively used to perform multi-scale segmentation on corresponding images to acquire multi-scale segmentation results having the same maximum scale as the original images. The registration model are used to acquire a multi-scale deformation field on the basis of the reference image, the floating image, a maximum scale reference image segmentation result, and a maximum scale floating image segmentation result. Each of a segmentation loss and a registration loss are the sum of segmentation and registration losses in each scale, and the segmentation loss includes a first-order gradient loss and/or a level set energy function loss. The present invention can improve registration accuracy.

10 Claims, 2 Drawing Sheets

(52) U.S. Cl.
CPC ............... *G06T 2207/20081* (2013.01); *G06T 2207/20084* (2013.01); *G06T 2207/20212* (2013.01); *G06T 2207/30004* (2013.01)

(58) Field of Classification Search
CPC ........... G06T 2207/20084; G06T 2207/20212; G06T 2207/30004; G06T 2207/20016; G06T 2207/10012; G06T 2207/20021; Y02T 10/40; G06V 10/764; G06V 10/774; G06V 10/806; G06V 10/82
See application file for complete search history.

(56) References Cited

U.S. PATENT DOCUMENTS

| | | | | |
|---|---|---|---|---|
| 2020/0380687 | A1* | 12/2020 | Avital | A61B 6/501 |
| 2021/0366137 | A1* | 11/2021 | Liu | G06N 3/047 |
| 2025/0064523 | A1* | 2/2025 | He | G16H 40/63 |
| 2025/0356484 | A1* | 11/2025 | Kim | G06T 7/0012 |

* cited by examiner

BUILDING METHOD OF MULTI-MODAL THREE-DIMENSIONAL MEDICAL IMAGE SEGMENTATION AND REGISTRATION MODEL, AND APPLICATION THEREOF

TECHNICAL FIELD

The present invention belongs to the field of medical image registration, and more specifically, relates to a building method of a multi-modal three-dimensional medical image segmentation and registration model, and an application thereof.

BACKGROUND ART

The morbidity of soft tissue cancer has increased rapidly in recent years, and the proportion of malignant tumors in causes of death is also increasing year by year. Cancer has become an important factor threatening human life and health. The optimal policy of response to cancer is early diagnosis and early treatment. For example, puncture biopsy is the gold standard for prostate cancer diagnosis, and an accurate prostate puncture navigation system can effectively increase the positive rate of puncture and reduce trauma caused thereby. Transrectal ultrasound is convenient, radiation-free, and real-time, is therefore often used for prostate puncture navigation, but is poor in identifying a tumor, and is prone to result in inaccurate target positioning. Magnetic resonance imaging has good resolution for soft tissue, and can distinguish between different types of lesions of the prostate, so that people pay great attention to how to simultaneously display, in an ultrasound image, rich information in a three-dimensional magnetic resonance image. The key technique is real-time accurate registration of three-dimensional magnetic resonance and ultrasound images.

At present, many scholars have proposed to use deep learning to achieve image registration. The mainstream method is to use a deep learning registration model to directly predict a pixel-level deformation field to achieve end-to-end registration, so as to avoid iteration, thereby speeding up registration. The mainstream deep learning registration models are mainly based on a convolutional neural network (CNN), and some researchers also combine the CNN with a transformer to improve performance thereof. Most of these models use encoding and decoding frameworks, and deformation parameters or deformation fields are output only at the end of the models. This design does not fully incorporate the features of registration tasks that the low-to-high resolution progressive registration process is involved. The registration performance thereof is limited.

Another problem of existing deep learning registration methods is that it is difficult to acquire true deformation fields for training. The early supervised registration method trains a deep learning model by marking a marker point of a particular anatomical structure or randomly generating a known deformation field, but the label acquisition costs thereof are high. In addition, it is difficult to effectively apply the method in actual tasks. Therefore, unsupervised methods are proposed for medical image registration. The principle of the unsupervised registration methods is to apply a predicted deformation field to a floating image first, and then a difference between a registered image and a reference image is evaluated via the designed similarity measures such as mean squared errors and normalized cross-correlation so as to build a loss function, and the performance of the methods depends on the similarity measures. Because a clear hierarchical structure can be observed in a magnetic resonance image of the prostate, but the internal tissue structure of the prostate in an ultrasound image is blurred, the similarity between the images of the two modalities is low, and it is difficult to use the existing loss function to train registration models for magnetic resonance images and ultrasound images of the prostate.

In order to solve the problem of image registration between multi-modal images with low similarity therebetween, such as magnetic resonance images and ultrasound images, some scholars have proposed to first extract a target region via image segmentation and then perform registration. This method can build a similarity loss according to the contour of the target region, and remove interference from a background region, but errors of the segmentation model tend to affect the performance of subsequent registration. For example, training data with segmentation errors is prone to result in wrong convergence and overfitting of the registration model.

SUMMARY OF THE INVENTION

In view of the defects in the prior art and improvement requirements, provided in the present invention are a building method of a multi-modal three-dimensional medical image segmentation and registration model, and an application thereof, and the objective thereof is to improve the accuracy of image registration between multi-modal three-dimensional medical images with a low degree of similarity.

In order to achieve the above objective, according to an aspect of the present invention, provided is a building method of a multi-modal three-dimensional medical image segmentation and registration model, comprising:

acquiring three-dimensional medical images of two modalities, of the same type and of a plurality of targets, wherein images of one modality are used as reference images, and images of the other modality are used as floating images; forming a pair of images by using three-dimensional medical images of two modalities corresponding to each target, and using the pair of images as a training sample, so as to acquire a training sample set; and using the training sample set to simultaneously train and optimize parameters of a reference image segmentation network, a floating image segmentation network, and a registration network on the basis of the sum of a segmentation loss and a registration loss, so as to acquire a segmentation and registration model formed by a reference image segmentation model, a floating image segmentation model, and a registration model;

wherein the reference image segmentation model and the floating image segmentation model are respectively correspondingly used to perform multi-scale segmentation on target regions in a reference image and a floating image, so as to acquire a multi-scale reference image segmentation result and a multi-scale floating image segmentation result of which the size of a maximum scale is the same as an original image size; the registration model is used to acquire a multi-scale deformation field on the basis of the reference image, the floating image, a maximum scale reference image segmentation result, and a maximum scale floating image segmentation result of each training sample, so as to achieve alignment and registration for the reference image and the floating image; each of the segmentation loss and the registration loss is the sum of segmentation and registration losses in each scale, and the segmentation loss comprises a first-order gradient loss and/or a level set energy function loss, and is used to quickly constrain a segmentation region into a uniform simply connected domain.

Further, network architectures of the reference image segmentation model, the floating image segmentation model, and the registration model are the same, and are all multi-scale self-attention networks.

Further, during training, segmentation losses $L_{seg}$ of the reference image segmentation model and the floating image segmentation model are both as follows:

$$L_{seg}(I, T, S) = L_{SegDice}(S, T) + L_{CE}(S, T) + L_{grad}(S) + L_{levelset}(I, S),$$

$$L_{SegDice}(S, T) = \sum_i \left(1 - \frac{2\sum_{j\in\Omega} S_j^i T_j^i}{\sum_{j\in\Omega} S_j^i + \sum_{j\in\Omega} T_j^i}\right),$$

$$L_{CE}(S, T) = \sum_i \frac{1}{m^i} \sum_{j\in\Omega} \left[T_j^i \log S_j^i + (1 - T_j^i)\log(1 - S_j^i)\right],$$

$$L_{grad}(S) = \sum_i \frac{1}{m^i} \|\nabla S^i\|_1,$$

$$L_{levelset}(I, S) = \sum_i \sum_{j\in\Omega} (I_j^i - C^i)^2 S_j^i,\ C^i = \frac{\sum_{j\in\Omega} I_j^i S_j^i}{\sum_{j\in\Omega} S_j^i},$$

in the formula, $L_{SegDice}$, $L_{CE}$, $L_{grad}$, and $L_{levelset}$ respectively representing a Dice loss, a cross-entropy loss, a first-order gradient loss, and a level set energy function loss, T representing a multi-scale segmentation label of the reference image or the floating image, S representing a multi-scale reference image segmentation result or a multi-scale floating image segmentation result, I representing the reference image or the floating image, i representing a different resolution, $m^i$ representing the total number of pixels of an image having a resolution of I, j representing a different pixel, and Ω representing an image domain.

Further, during training, a registration loss $L_{reg}$ of the registration model is:

$$L_{reg}(T_m, T_f, \phi) = L_{RegDice}(T_m, T_f, \phi) + \lambda L_{MSE}(T_m, T_f, \phi) + \beta R(\phi),$$

$$L_{RegDice}(T_m, T_f, \phi) = \sum_i \left(1 - \frac{2\sum_{j\in\Omega} T_{f,j}^i (T_m^i \circ \phi^i)_j}{\sum_{j\in\Omega} T_{f,j}^i \sum_{j\in\Omega} (T_m^i \circ \phi^i)_j}\right),$$

$$L_{MSE}(T_m, T_f, \phi) = \sum_i \frac{1}{m^i} \sum_{j\in\Omega} \left|T_{f,j}^i - (T_m^i \circ \phi^i)_j\right|^2,$$

$$R(\phi) = \sum_i \frac{1}{m^i} \|\nabla \phi^i\|_1 + \sum_i \frac{1}{m^i} \|\sigma(-|\nabla \phi^i|)\|_1,$$

in the formula, $L_{RegDice}$, $L_{MSE}$, R respectively representing a Dice loss, a mean squared error loss, and a regularization loss, $T_m$, $T_f$ representing segmentation labels of the floating image and the reference image, φ representing a deformation field, λ and β being respectively coefficients, $$T_m^i \circ \phi^i$$

representing transforming a floating image label $$T_m^i$$

having a resolution of i according to a deformation field $\phi^i$ having a resolution of i via linear interpolation, and σ(•) representing an activation function having a value range of [0, +∞).

Further, the value of λ is 10, and the value of β is 0.1.

Further, the multi-scale self-attention network comprises: an encoding module, and cascaded n groups of decoding modules, encoding and decoding branch feature fusion modules, and self-attention modules, n being the total number of scales corresponding to the multi-scale, wherein the encoding module is used to perform different scales of encoding on a received three-dimensional image, so as to acquire a feature map $$f_e^1$$

of the same resolution as the input three-dimensional image and n feature maps of different resolutions all lower than the resolution of the feature map $$f_e^1,$$

the cascaded n groups of decoding modules, encoding and decoding branch feature fusion modules, and self-attention modules are used according to the resolutions of encoded feature maps in ascending order, first, the encoding module in the first group is used to perform feature extraction on the feature map of the lowest resolution acquired by means of the encoding and to upsample the same to a corresponding upper level of resolution in the encoding adjacent to the resolution of a current feature extraction result, the encoding and decoding branch feature fusion module fuses the feature map output by the decoding module in the same group and the feature map of the same resolution acquired by means of the encoding, so as to acquire a decoded feature map, and the self-attention module performs self-attention principle calculation on the basis of the decoded feature map and an image having the same resolution as the decoded feature map and acquired by resampling the combined image, so as to acquire a self-attention feature map of the corresponding resolution and a deformation field or a segmentation result of the corresponding resolution; the self-attention feature map is used as an input of the decoding module in the second group of the decoding module, the encoding and decoding branch feature fusion module, and the self-attention module, and the above-described process is repeated until the self-attention module in the n-th group of the decoding module, the encoding and decoding branch feature fusion module, and the self-attention module outputs a deformation field or a segmentation result having the resolution of the original image.

Further, the encoding module comprises a convolutional layer and parallel-connected n groups of residual convolution modules and convolutional downsampling modules, wherein the convolutional layer is used to perform feature map extraction on a received three-dimensional image to acquire the feature map $$f_e^1;$$

and the cascaded n groups of residual convolution modules and convolutional downsampling modules are respectively used to perform feature extraction and resampling on a feature map output by an upper stage, so as to acquire n feature maps of different resolutions all lower than the resolution of the feature map $$f_e^1;$$

the decoding module comprises a residual convolution module and a convolutional upsampling module, wherein the residual convolution module is used to perform feature extraction on the received three-dimensional image, and the convolutional upsampling module is used to upsample a feature extraction result.

Further, the self-attention module performs the self-attention principle calculation in the following manner:

$$V_o^i = \text{softmax}\left(Q_D^i \times K_I^i \cdot ps^{-3/2}\right) \times V_I^i,$$

$$\hat{f}_D^i = \text{unflatten}\left(V_o^i\right) + f_D^i,$$

$$Y^i = FFN\left(LayerNorm\left(\hat{f}_D^i\right)\right),$$

$$f_c^i = FFN\left(Y^i\right);$$

where in the formula, $$Q_D^i$$

represents a corresponding self-attention component resulting from embedding performed by a fully connected layer on two-dimensional matrix data, the two-dimensional matrix data being acquired by evenly dividing, in the spatial dimension, the decoded feature map $$f_D^i$$

received by the self-attention module and having a resolution of I into a plurality of locally related regions, and by compressing each of the locally related regions into a vector;

$$K_I^i,\ V_I^i$$

respectively represent corresponding two self-attention components resulting from embedding performed by two different fully connected layers on two-dimensional matrix data, the two-dimensional matrix data being acquired by evenly dividing, in the spatial dimension, an image having a resolution of i and acquired by resampling the combined image received by the self-attention module, and by compressing, into a vector, each of the locally related regions; ps represents an edge length of the locally related region; unflatten represents a dimensional operation function for deconstructing a matrix into image features; LayerNorm(•) represents layer normalization calculation; FFN represents a feedforward neural network; and $$f_c^i$$

represents a self-attention feature map having a resolution of i.

Further provided in the present invention is a multi-modal three-dimensional medical image segmentation and registration method, which uses a segmentation and registration model built by means of the building method described above to perform the following steps:

acquiring three-dimensional medical images of two modalities of a target, wherein the image of one modality is used as a reference image, and the image of the other modality is used as a floating image;

using a reference image segmentation model in the segmentation and registration model to perform multi-scale segmentation on a target region in the reference image, so as to acquire a multi-scale reference image segmentation result; using a floating image segmentation model in the segmentation and registration model to perform multi-scale segmentation on a target region in the floating image, so as to acquire a multi-scale floating image segmentation result;

inputting the reference image, the floating image, a maximum scale reference image segmentation result, and a maximum scale floating image segmentation result into a registration model in the segmentation and registration model, so as to acquire a multi-scale deformation field; and displacing each pixel point in the floating image on the basis of a maximum-scale deformation field in the multi-scale deformation field, so as to achieve alignment and registration for the reference image and the floating image.

Further provided in the present invention is a computer-readable storage medium, comprising a stored computer program, wherein when executed by a processor, the computer program controls a device where the storage medium is located to perform the building method of a multi-modal three-dimensional medical image segmentation and registration model described above and/or the multi-modal three-dimensional medical image segmentation and registration method described above.

In general, the above technical solutions proposed in the present invention can achieve the following beneficial effects:

(1) The present invention provides a novel building method of a registration model, and innovatively proposes building of a segmentation and registration model. That is, models corresponding to segmentation and registration are trained synchronously, and are collectively referred to as a segmentation and registration model in the present invention. Specifically, in view of segmentation and registration of medical images, it is proposed to use a multi-scale network to respectively perform multi-scale segmentation and registration. At each resolution level in segmentation and registration processes, a deformation field or a segmentation result map is correspondingly generated. During building of a loss function, a segmentation loss and a registration loss are each the sum of segmentation and registration losses in each scale, and parameter adjustment is performed on all network models on the basis of the sum of the segmentation loss and the registration loss. In such a synchronous training manner, parameter adjustment of the segmentation model actually improves registration accuracy by means of improving segmentation accuracy, thereby avoiding the existing problem of overfitting caused by independent training of segmentation and registration, and improving the training effect of the registration model. In addition, compared with an end-to-end registration model, a deformation field output by the segmentation and registration model finally acquired by the method is optimized multiple times from overall to detailed levels, so that the segmentation and registration model has higher registration accuracy. In addition, the level set energy function loss and the gradient loss are added to the segmentation loss to quickly constrain a segmentation region into a uniform simply connected domain during early training, so as to ensure the accuracy of the early training of the registration model. Therefore, the present invention improves overall registration performance while implementing the segmentation model and the registration model simultaneously.

(2) In the multi-scale self-attention network proposed in the present invention, at each resolution level in the decoding process, a self-attention module is guided by an original input to form a deformation field or a segmented image of a corresponding resolution by using input features, and the segmentation and registration performance are enhanced by introducing a cascaded update process from low resolutions to high resolutions.

(3) The registration loss employed by the method of the present invention comprises constraints on the contour and constraints on the regularization of the deformation field, thereby improving registration accuracy while reducing folding.

DETAILED DESCRIPTION

In order to make the purpose, technical solution, and advantages of the present invention clearer, the present invention is described in further detail below with reference to the accompanying drawings and embodiments. It should be appreciated that the specific embodiments described here are used merely to explain the present invention and are not used to limit the present invention. In addition, the technical features involved in various embodiments of the present invention described below can be combined with one another as long as they do not constitute a conflict therebetween.

Embodiment 1

A building method of a multi-modal three-dimensional medical image segmentation and registration model includes:

S1, acquiring three-dimensional medical images of two modalities, of the same type and of a plurality of targets, wherein images of one modality are used as reference images, and images of the other modality are used as floating images; and forming a pair of images by using three-dimensional medical images of two modalities corresponding to each target, and using the pair of images as a training sample, so as to acquire a training sample set.

It should be noted that considering that an image may include a relatively large number of regions other than a target organ during actual medical image acquisition, in order to improve calculation efficiency, an acquired three-dimensional image is typically trimmed in the industry, and then pixel value normalization processing is performed on pixels within the image. The processed three-dimensional image is used as the three-dimensional medical image acquired in step S1 of the present method.

S2, using the training sample set to simultaneously train and optimize parameters of a reference image segmentation network, a floating image segmentation network, and a registration network on the basis of the sum of a segmentation loss and a registration loss, so as to acquire a segmentation and registration model formed by a reference image segmentation model, a floating image segmentation model, and a registration model.

Figure 1:
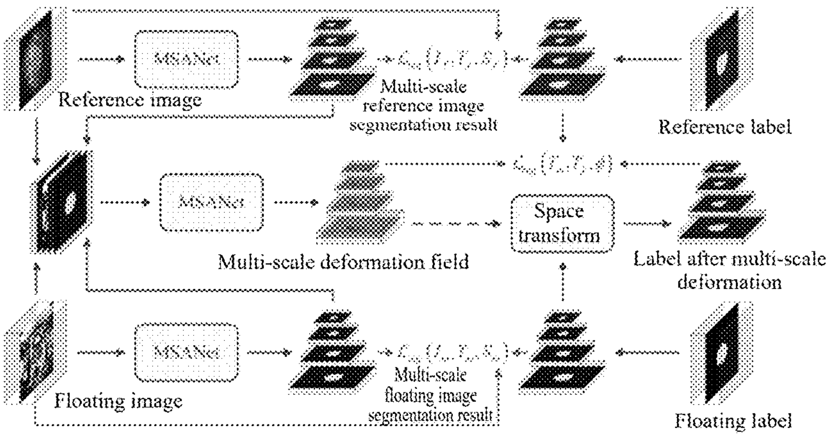
FIG. 1 is a schematic flowchart of a building method of a multi-modal three-dimensional medical image segmentation and registration model according to an embodiment of the present invention.

As shown in FIG. 1, the reference image segmentation model and the floating image segmentation model are respectively correspondingly used to perform multi-scale segmentation on target regions in a reference image and a floating image, so as to acquire a multi-scale reference image segmentation result and a multi-scale floating image segmentation result of which the size of a maximum scale is the same as an original image size; the registration model is used to acquire a multi-scale deformation field on the basis of the reference image, the floating image, a maximum scale reference image segmentation result, and a maximum scale floating image segmentation result of each training sample, so as to achieve alignment and registration for the reference image and the floating image; each of the segmentation loss and the registration loss is the sum of segmentation and registration losses in each scale, and the segmentation loss includes a first-order gradient loss and/or a level set energy function loss, and is used to quickly constrain a segmentation region into a uniform simply connected domain.

It should be noted that before training, it is typical in the industry to first determine network architectures of the reference image segmentation model, the floating image segmentation model, and the registration model, and initialize parameters. Additionally, the multi-scale segmentation may be as follows: first, the original image is resampled to acquire images of different scales (i.e., different resolutions), then a segmentation network model performs a segmentation operation on target regions in the images of different scales, to acquire a multi-scale segmentation result. The resampling operation may be classified as one of the functions of the segmentation network model. The deformation field is formed by displacement amounts of pixel points in the reference image relative to corresponding points in the floating image.

The method of the present embodiment is a novel registration model building method, and building of a segmentation and registration model is innovatively proposed. That is, models corresponding to segmentation and registration are trained synchronously, and are collectively referred to as a segmentation and registration model. The method introduces a multi-scale module, and provides a loss function of both segmentation and registration to improve registration performance. The trained model can perform registration for a target region in a multi-modal medical image.

As a preferred embodiment, network architectures of the reference image segmentation model, the floating image segmentation model, and the registration model are all multi-scale self-attention networks, thereby achieving high accuracy.

The training process uses a multi-scale output generated by the model, a multi-modal original image, and a segmentation label corresponding to each modal image to build a loss function, and a training objective is to minimize the loss function. The original image and the corresponding segmentation label are downsampled into a plurality of different resolutions to build multi-scale losses. Specifically, the segmentation loss is the sum of losses corresponding to multi-scale segmentation. The registration loss also involves the sum of losses corresponding to a plurality of scales according to features of loss items.

The first-order gradient loss may specifically be:

$$L_{grad}(S)=\sum_i \frac{1}{m^i}\|\nabla S^i\|_1,$$

in the formula, S representing a multi-scale reference image segmentation result or a multi-scale floating image segmentation result, i representing a different resolution, and $m^i$ representing the total number of pixels of an image corresponding to the resolution of i.

The level set energy function loss may specifically be:

$$L_{levelset}(I,S)=\sum_i\sum_{j\in\Omega}\left(I_j^i-C^i\right)^2 S_j^i,\ C^i=\frac{\sum_{j\in\Omega} I_j^i S_j^i}{\sum_{j\in\Omega} S_j^i},$$

in the formula, I representing an original reference image or floating image (i.e., the trimmed normalized original image), S representing a multi-scale reference image segmentation result or a multi-scale floating image segmentation result, i representing a different resolution, j representing a different pixel, and Ω representing an image domain.

Accordingly, as a preferred embodiment, during training, segmentation losses $L_{seg}$ of the reference image segmentation model and the floating image segmentation model are both as follows:

$$L_{seg}(I,T,S)=L_{SegDice}(S,T)+L_{CE}(S,T)+L_{grad}(S)+L_{levelset}(I,S),$$

$$L_{SegDice}(S,T)=\sum_i\left(1-\frac{2\sum_{j\in\Omega} S_j^i T_j^i}{\sum_{j\in\Omega} S_j^i+\sum_{j\in\Omega} T_j^i}\right),$$

$$L_{CE}(S,T)=\sum_i\frac{1}{m^i}\sum_{j\in\Omega}\left[T_j^i\log S_j^i+\left(1-T_j^i\right)\log\left(1-S_j^i\right)\right],$$

$$L_{grad}(S)=\sum_i\frac{1}{m^i}\|\nabla S^i\|_1,$$

$$L_{levelset}(I,S)=\sum_i\sum_{j\in\Omega}\left(I_j^i-C^i\right)^2 S_j^i,\ C^i=\frac{\sum_{j\in\Omega} I_j^i S_j^i}{\sum_{j\in\Omega} S_j^i},$$

in the formula, $L_{SegDice}$, $L_{CE}$, $L_{grad}$, and $L_{levelset}$ respectively representing a Dice loss, a cross-entropy loss, a first-order gradient loss, and a level set energy function loss, T representing a multi-scale segmentation label of the reference image or the floating image, S representing a multi-scale reference image segmentation result or a multi-scale floating image segmentation result, I representing the original reference image or floating image, i representing a different resolution, and $m^i$ representing the total number of pixels of an image having a resolution of i, j representing a different pixel, and Ω representing an image domain.

As a preferred embodiment, during training, a registration loss $L_{reg}$ of the registration model is:

$$L_{reg}(T_m,T_f,\phi)=L_{RegDice}(T_m,T_f,\phi)+\lambda L_{MSE}(T_m,T_f,\phi)+\beta R(\phi),$$

$$L_{RegDice}(T_m,T_f,\phi)=\sum_i\left(1-\frac{2\sum_{j\in\Omega} T_{f,j}^i\left(T_m^i\circ\phi^i\right)_j}{\sum_{j\in\Omega} T_{f,j}^i\sum_{j\in\Omega}\left(T_m^i\circ\phi^i\right)_j}\right),$$

$$L_{MSE}(T_m,T_f,\phi)=\sum_i\frac{1}{m^i}\sum_{j\in\Omega}\left|T_{f,j}^i-\left(T_m^i\circ\phi^i\right)_j\right|^2,$$

$$R(\phi)=\sum_i\frac{1}{m^i}\|\nabla\phi^i\|_1+\sum_i\frac{1}{m^i}\|\sigma(-|\nabla\phi^i|)\|_1,$$

in the formula, $L_{RegDice}$, $L_{MSE}$, R respectively representing a Dice loss, a mean square error loss, and a regularization loss, $T_m$, $T_f$ representing segmentation labels of the floating image and the reference image, ϕ representing a deformation field, λ and β being respectively coefficients, preferably, the value of λ being 10, the value of β being 0.1, $$T_m^i \circ \phi^i$$

representing transforming a floating image label $$T_m^i$$

having a resolution of i according to a deformation field $\phi^i$ having a resolution of i via linear interpolation, and σ(•) representing an activation function having a value range of [0, +∞).

Figure 2:
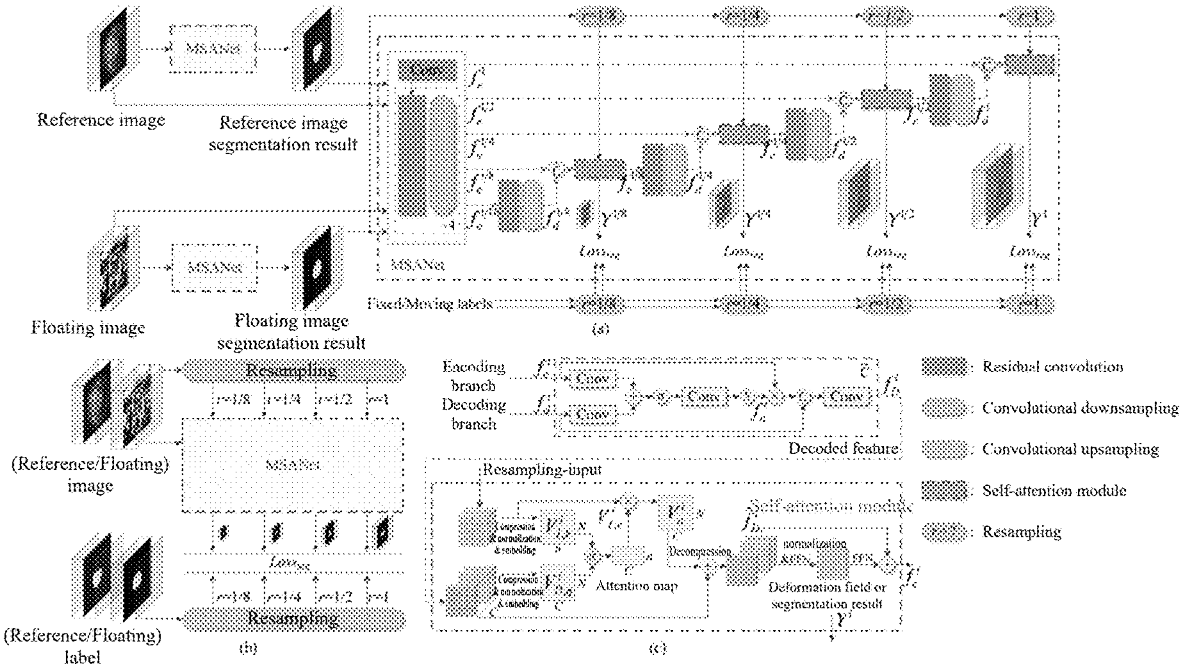
FIG. 2 is a schematic structural diagram showing details of a segmentation and registration model according to an embodiment of the present invention.

As a preferred embodiment, as shown in FIG. 2, the multi-scale self-attention network includes: an encoding module, and cascaded n groups of decoding modules, encoding and decoding branch feature fusion modules, and self-attention modules, n being the total number of scales corresponding to the multi-scale, wherein the encoding module is used to perform different scales of encoding on a received three-dimensional image, so as to acquire a feature map $$f_e^1$$

of the same resolution as the input three-dimensional image and n feature maps of different resolutions all lower than the resolution of the feature map $$f_e^1$$

(e.g., four feature maps $$f_e^{1/2},\ f_e^{1/4},\ f_e^{1/8},\ \text{and}\ f_e^{1/16}$$

with resolutions that are respectively ½, ¼, ⅛, and 1/16 of the original resolution). It should be further noted that if the multi-scale self-attention network is used as the segmentation model, then the three-dimensional image received by the encoding module is the reference image or the floating image. If the multi-scale self-attention network is used as the registration model, then the three-dimensional image received by the encoding module is a three-dimensional image acquired by combining the reference image, the floating image, the maximum scale reference image segmentation result, and the maximum scale floating image segmentation result.

The cascaded n groups of decoding modules, encoding and decoding branch feature fusion modules, and self-attention modules are used according to the resolutions of encoded feature maps in ascending order. First of all, the encoding module in the first group is used to perform feature extraction on the feature map of the lowest resolution acquired by means of the encoding and to upsample the same to a corresponding upper level of resolution in the encoding adjacent to the resolution of a current feature extraction result. The encoding and decoding branch feature fusion module fuses the feature map output by the decoding module in the same group and the feature map of the same resolution acquired by means of the encoding, so as to acquire a decoded feature map. The self-attention module performs self-attention principle calculation on the basis of the decoded feature map and an image having the same resolution as the decoded feature map and acquired by resampling the combined image, so as to acquire a self-attention feature map of the corresponding resolution and a deformation field or a segmentation result of the corresponding resolution (if the multi-scale self-attention network is used as the segmentation model, then a segmentation result is acquired here, and if the multi-scale self-attention network is used as the registration model, then a deformation field is acquired here). The self-attention feature map is used as an input of the decoding module in the second group of the decoding module, the encoding and decoding branch feature fusion module, and the self-attention module. The above-described process is repeated until the self-attention module in the n-th group of the decoding module, the encoding and decoding branch feature fusion module, and the self-attention module outputs a deformation field or a segmentation result having the resolution of the original image. For example, the value of n is four. The deformation fields or segmentation results output by the self-attention modules in the four groups of decoding modules, encoding and decoding branch feature fusion modules, and self-attention modules are respectively $Y^{1/8}$, $Y^{1/4}$, $Y^{1/2}$, and $Y^1$. The superscripts all represent the ratio of the resolution to the original image resolution.

As a preferred embodiment, the encoding module includes a convolutional layer and parallel-connected n groups of residual convolution modules and convolutional downsampling modules, wherein the convolutional layer is used to perform feature map extraction on a received three-dimensional image to acquire the feature map $$f_e^1;$$

the cascaded n groups of residual convolution modules and convolutional downsampling modules are respectively used to perform feature extraction and resampling on a feature map output by an upper stage, so as to acquire n feature maps of different resolutions all lower than the resolution of the feature map $$f_e^1;$$

the decoding module includes a residual convolution module and a convolutional upsampling module, wherein the residual convolution module is used to perform feature extraction on the received three-dimensional image, and the convolutional upsampling module is used to upsample a feature extraction result.

As a preferred embodiment, the self-attention module performs the self-attention principle calculation in the following manner:

$$V_o^i = \text{softmax}\left(Q_D^i \times K_I^i \cdot ps^{-3/2}\right) \times V_I^i,$$

$$\hat{f}_D^i = \text{unflatten}\left(V_o^i\right) + f_D^i,$$

-continued $$Y^i = FFN\left(LayerNorm\left(\hat{f}^{i}_{D}\right)\right),$$

$$f_c^i = FFN\left(Y^i\right);$$

where in the formula, $$Q_D^i$$

represents a corresponding self-attention component resulting from embedding performed by a fully connected layer on two-dimensional matrix data, the two-dimensional matrix data being acquired by evenly dividing, in the spatial dimension, the decoded feature map $$f_D^i$$

received by the self-attention module and having a resolution of I into a plurality of locally related regions, and by compressing each of the locally related regions into a vector;

$$K_I^i, V_I^i$$

respectively represent corresponding two self-attention components resulting from embedding performed by two different fully connected layers on two-dimensional matrix data, the two-dimensional matrix data being acquired by evenly dividing, in the spatial dimension, an image having a resolution of i and acquired by resampling the combined image received by the self-attention module, and by compressing, into a vector, each of the locally related regions; ps represents an edge length of the locally related region; unflatten represents a dimensional operation function for deconstructing a matrix into image features; LayerNorm(•) represents layer normalization calculation; FFN represents a feedforward neural network; and $$f_c^i$$

represents a self-attention feature map having a resolution of i.

As shown in FIG. c in FIG. 2, the calculation process may be interpreted as follows: first, evenly dividing, in the spatial dimension, the decoded feature map $$f_D^i$$

received by the self-attention module and having a resolution of i and the image acquired by resampling the combined image and having a resolution of i into a plurality of locally related regions, and compressing each locally related region into a vector to acquire a two-dimensional matrix corresponding to the decoded feature map $$f_D^i$$

and a two-dimensional matrix corresponding to the image acquired by resampling the combined image and having a resolution of i; and then, respectively subjecting the two two-dimensional matrices to embedding performed by a fully connected layer, to acquire $$Q_D^i, K_I^i, V_I^i.$$

The three feature vector sets (i.e., the feature matrices)

$$Q_D^i, K_I^i, V_I^i$$

generate an output vector $$V_o^i$$

on the basis of the self-attention principle, and after the output vector $$V_o^i$$

is deconstructed into an image feature, the image feature and $$f_D^i$$

are added to acquire $$\hat{f}^i_D. \hat{f}^i_D$$

is subjected to layer normalization, and then an output $Y^i$ (a segmentation result $S^i$ or a registration deformation field $\phi^i$) of the current resolution and a feature $$f_c^i$$

to be transmitted downward are generated via two feedforward neural networks (FFNs).

Preferably, in the encoding and decoding branch feature fusion, as shown in FIG. c in FIG. 2, two features of encoding and decoding branches of a certain resolution are respectively denoted as $$f_e^i \text{ and } f_d^i. \text{ First, } f_e^i$$

is combined with $$f_d^i,$$

and an attention map $$f_a^i$$

is generated via a convolution and activation function. Then, $$f_a^i$$

is multiplied by $$f_e^i,$$

and is then combined with $$f_d^i$$

to generate a decoded feature $$f_D^i$$

via convolution. The calculation process is as follows:

$$f_a^i = S\left(\sigma\left(f_e^i * w_1^i + f_d^i * w_2^i\right) * w_3^i\right)$$

$$f_D^i = \left(f_a^i \cdot f_e^i\right) * w_4^i + f_d^i * w_5^i$$

i representing a different resolution, $$w_1^i,\ w_2^i,\ w_3^i,\ w_4^i, \text{ and } w_5^i$$

representing different convolution parameters, σ(•) representing a ReLU activation function, and S(•) being a Sigmoid function.

Embodiment 2

A multi-modal three-dimensional medical image segmentation and registration method uses a segmentation and registration model built by using the building method described in Embodiment 1 to perform the following steps:

acquiring three-dimensional medical images of two modalities of a target, wherein the image of one modality is used as a reference image, and the image of the other modality is used as a floating image;

using a reference image segmentation model in the segmentation and registration model to perform multi-scale segmentation on a target region in the reference image, so as to acquire a multi-scale reference image segmentation result; using a floating image segmentation model in the segmentation and registration model to perform multi-scale segmentation on a target region in the floating image, so as to acquire a multi-scale floating image segmentation result;

inputting the reference image, the floating image, a maximum scale reference image segmentation result, and a maximum scale floating image segmentation result into a registration model in the segmentation and registration model, so as to acquire a multi-scale deformation field; and displacing each pixel point in the floating image on the basis of a maximum-scale deformation field in the multi-scale deformation field, so as to achieve alignment and registration for the reference image and the floating image.

That is, a multi-modal three-dimensional medical image to be subjected to registration is acquired, and is trimmed according to a region of interest, and then pixel value normalization processing is performed. Then, the image is input into the trained segmentation and registration model to acquire a deformation field, thereby acquiring a registration result.

The related technical solution is the same as that in Embodiment 1, and will not be described herein again.

To better describe the effect of the present invention, the following examples are provided for verification:

On the basis of the above method, training and testing of a multi-modal three-dimensional medical image segmentation and registration model were performed as Example 1, and specifically included the following steps:

(1) Data was acquired from Prostate-MRI-US-Biopsy data sets of a public database of The Cancer Imaging Archive (TCIA). Matching was performed therein, and 502 pieces of data including magnetic resonance images and ultrasound images and prostate labels corresponding thereto were acquired. 452 pieces of data were randomly selected therefrom for model training, and the remaining 50 pieces of data were used for model testing. During preprocessing, the original images were resampled into the spatial resolution of 1 mm×1 mm×1 mm. During training, an equal amount of random panning was added to each pair of images, thereby enhancing data diversity.

(2) By means of the above training set, the provided segmentation and registration model (shortly referred to as MSANet) was trained by using the loss function provided in the present invention. Optimal model parameters were loaded, and applied to the test set. A registration result of the prostate region in the image was output. Finally, the registration accuracy was quantitatively evaluated.

Further, in order to verify the method of the present invention, the following comparative examples (the comparative examples used the same data set) were designed:

Comparative Example 1

Morph (VoxelMorph: A Learning Framework for Deformable Medical Image Registration. IEEE Trans. Med. Imaging 38, 1788-1800, 2019) was used to perform a registration task with respect to a prostate region in a multi-modal three-dimensional medical image. Training was performed by using the data set, the learning rate, the number of iterations, and the optimizer parameters that were the same as those in the method of the present invention.

Comparative Example 2

TransMorph (TransMorph: Transformer for unsupervised medical image registration. Medical Image Analysis 82, 102615, 2022) was used to perform a registration task with respect to a prostate region in a multi-modal three-dimensional medical image. Training was performed by using the data set, the learning rate, the number of iterations, and the optimizer parameters that were the same as those in the method of the present invention.

Comparative Example 3

ASNet (Adversarial learning for mono- or multi-modal registration. Medical Image Analysis 58, 101545, 2019) was used to perform a registration task with respect t to a prostate region in a multi-modal three-dimensional medical image. Training was performed by using the data set, the learning rate, the number of iterations, and the optimizer parameters that were the same as those in the method of the present invention.

Comparative Example 4

Attention-Reg (Cross-modal attention for multi-modal image registration. Medical Image Analysis 82, 102612, 2022) was used to perform a registration task with respect to a prostate region in a multi-modal three-dimensional medical image. Training was performed by using the data set, the learning rate, the number of iterations, and the optimizer parameters that were the same as those in the method of the present invention.

Result Analysis:

To show the advantages of the present invention, the registration performance of Example 1 was compared with those of Comparative Examples 1-4. In quantitative comparison, evaluation was performed by using the Dice similarity coefficient (DSC), 95% Hausdorff distance (HD95), and the ratio of pixels less than 0 ($|J_\phi| \leq 0$) in the Jacobian determinant matrix of the deformation field, and the definitions are as follows:

$$DSC(T_m, T_f, \phi) = \frac{2|T_f \cap (T_m \circ \phi)|}{|T_f| + |T_m \circ \phi|};$$

$$HD95 = \max_{k95\%}[d(X, Y), d(Y, X)];$$

$$d(X, Y) = \left\{\min_{y \in Y}\|x - y\| \,|\, x \in X\right\},\ d(Y, X) = \left\{\min_{x \in X}\|y - x\| \,|\, y \in Y\right\};$$

$$|J_\phi| \leq 0 = \frac{\|\nabla\phi| \leq 0|}{\|\nabla\phi| \leq 0| + \|\nabla\phi| > 0|};$$

where max k95% indicated that the maximum value of 95% was used, and X and Y represented sets of edge points of two regions for indicator calculation.

Table 1 shows the quantitative evaluation result of the registration results of Example 1 and Comparative Example 1-4. It can be seen that MSANet provided in the present invention achieved the greatest average DSC and the smallest average HD95, and the variance thereof was the smallest. Moreover, the average folding ratio of the deformation field predicted by MSANet was 0.001, and the variance was 0.0003. The average folding ratio and the variance were both less than those in the results of Comparative Examples 1-4. The above results show that the present invention achieved more accurate registration for prostates in three-dimensional magnetic resonance and ultrasound images.

TABLE 1

DSC, HD95, and folding ratios of registration methods for selected data sets

| Methods | DSC | HD95 | $\lvert J_\phi \rvert \leq 0$ |
|---|---|---|---|
| MSANet | 0.924 ± 0.018 | 1.440 ± 0.328 | 0.0010 ± 0.0003 |
| Morph | 0.886 ± 0.115 | 2.247 ± 1.171 | 0.0035 ± 0.0019 |
| TransMorph | 0.912 ± 0.021 | 1.495 ± 0.391 | 0.0010 ± 0.0005 |
| ASNet | 0.818 ± 0.103 | 12.259 ± 3.932 | 0.0038 ± 0.0025 |
| Attention-Reg | 0.846 ± 0.131 | 2.568 ± 1.491 | 0.0021 ± 0.0013 |

Figure 3:
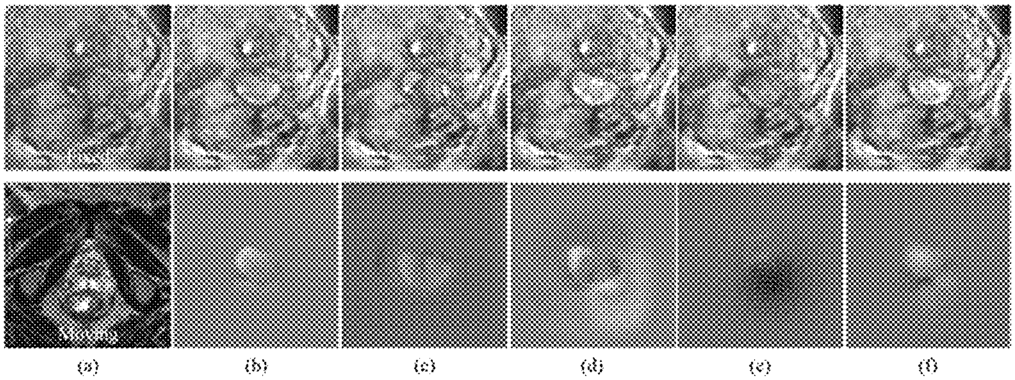
FIG. 3 is visual effect diagrams of registration results corresponding to Example 1 and Comparative Examples 1-4 according to an embodiment of the present invention, wherein (a) is an original multi-modal image and a target region, and (b) to (f) respectively correspond to visual effect diagrams and deformation fields after registration is performed by using MSANet, Morph, TransMorph, ASNet, and Attention-Reg.

In order to more intuitively show the advantages of the present invention, visual effect diagrams of the registration results corresponding to Example 1 and Comparative Examples 1-4 and visual diagrams of the deformation fields corresponding thereto are provided. As shown in FIG. 3, (a) shows the original medical image and a prostate region label corresponding thereto, and (b) to (f) respectively correspond to the registration results of MSANet, Morph, TransMorph, ASNet, and Attention-Reg, and show the coincidence degrees of the prostate region before and after the multi-modal image registration. Obviously, after the registration performed by the method of the present invention, the consistency between the prostate regions in the ultrasound and magnetic resonance images is excellent.

In the above embodiments, the registration of the prostate region in the ultrasound and magnetic resonance images is used as an example to sufficiently show that the present invention achieves higher registration accuracy for multi-modal three-dimensional medical images. Embodiment 1 is based on deep learning, and can be used for registration tasks for a multi-modal three-dimensional medical image.

The above embodiments are merely examples. In addition to ultrasound and magnetic resonance images, the method of the present invention is also applicable to registration for three-dimensional medical images of other modalities, such as ultrasound, CT, etc. In addition, the method of the present invention is also applicable to medical image registration for the kidney and other regions.

Embodiment 3

A computer-readable storage medium includes a stored computer program, wherein when executed by a processor, the computer program controls a device where the storage medium is located to perform the building method of a multi-modal three-dimensional medical image segmentation and registration model according to Embodiment 1 and/or the multi-modal three-dimensional medical image segmentation and registration method according to Embodiment 2.

The related technical solution is the same as that in Embodiment 1, and will not be described herein again.

It should be easily understood by those skilled in the art that the foregoing description is only preferred embodiments of the present invention and is not intended to limit the present invention. All modifications, identical replacements and improvements within the spirit and principle of the present invention should be in the scope of protection of the present invention.

The invention claimed is:

1. A building method of a multi-modal three-dimensional medical image segmentation and registration model, comprising:

acquiring three-dimensional medical images of two modalities, of the same type and of a plurality of targets, wherein images of one modality are used as reference images, and images of the other modality are used as floating images; forming a pair of images by using three-dimensional medical images of two modalities corresponding to each target, and using the pair of images as a training sample, so as to acquire a training sample set; and using the training sample set to simultaneously train and optimize parameters of a reference image segmentation network, a floating image segmentation network, and a registration network on the basis of the sum of a segmentation loss and a registration loss, so as to acquire a segmentation and registration model formed by a reference image segmentation model, a floating image segmentation model, and a registration model;

wherein the reference image segmentation model and the floating image segmentation model are respectively correspondingly used to perform multi-scale segmentation on target regions in a reference image and a floating image, so as to acquire a multi-scale reference image segmentation result and a multi-scale floating image segmentation result of which the size of a maximum scale is the same as an original image size; the registration model is used to acquire a multi-scale deformation field on the basis of the reference image, the floating image, a maximum scale reference image segmentation result, and a maximum scale floating image segmentation result of each training sample, so as to achieve alignment and registration for the reference image and the floating image; each of the segmentation loss and the registration loss is the sum of segmentation and registration losses in each scale, and the segmentation loss comprises a first-order gradient loss and/or a level set energy function loss, and is used to quickly constrain a segmentation region into a uniform simply connected domain.

2. The building method according to claim 1, wherein network architectures of the reference image segmentation model, the floating image segmentation model, and the registration model are the same, and are all multi-scale self-attention networks.

3. The building method according to claim 1, wherein during training, segmentation losses $L_{seg}$ of the reference image segmentation model and the floating image segmentation model are both as follows:

$$L_{seg}(I, T, S) = L_{SegDice}(S, T) + L_{CE}(S, T) + L_{grad}(S) + L_{levelset}(I, S),$$

$$L_{SegDice}(S, T) = \sum_i \left( 1 - \frac{2\sum_{j\in\Omega} S_j^i T_j^i}{\sum_{j\in\Omega} S_j^i + \sum_{j\in\Omega} T_j^i} \right),$$

$$L_{CE}(S, T) = \sum_i \frac{1}{m^i} \sum_{j\in\Omega} \left[ T_j^i \log S_j^i + (1 - T_j^i)\log(1 - S_j^i) \right],$$

$$L_{grad}(S) = \sum_i \frac{1}{m^i} \|\nabla S^i\|_1,$$

$$L_{levelset}(I, S) = \sum_i \sum_{j\in\Omega} (I_j^i - C^i)^2 S_j^i,\ C^i = \frac{\sum_{j\in\Omega} I_j^i S_j^i}{\sum_{j\in\Omega} S_j^i},$$

in the formula, $L_{SegDice}$, $L_{CE}$, $L_{grad}$, and $L_{levelset}$ respectively representing a Dice loss, a cross-entropy loss, a first-order gradient loss, and a level set energy function loss, T representing a multi-scale segmentation label of the reference image or the floating image, S representing a multi-scale reference image segmentation result or a multi-scale floating image segmentation result, I representing the reference image or the floating image, i representing a different resolution, $m^i$ representing the total number of pixels of an image having a resolution of i, j representing a different pixel, and Ω representing an image domain.

4. The building method according to claim 1, wherein during training, a registration loss $L_{reg}$ of the registration model is:

$$L_{reg}(T_m, T_f, \phi) = L_{RegDice}(T_m, T_f, \phi) + \lambda L_{MSE}(T_m, T_f, \phi) + \beta R(\phi),$$

$$L_{RegDice}(T_m, T_f, \phi) = \sum_i \left( 1 - \frac{2\sum_{j\in\Omega} T_{f,j}^i (T_m^i \circ \phi^i)_j}{\sum_{j\in\Omega} T_{f,j}^i \sum_{j\in\Omega} (T_m^i \circ \phi^i)_j} \right),$$

$$L_{MSE}(T_m, T_f, \phi) = \sum_i \frac{1}{m^i} \sum_{j\in\Omega} \left| T_{f,j}^i - (T_m^i \circ \phi^i)_j \right|^2,$$

$$R(\phi) = \sum_i \frac{1}{m^i} \|\nabla \phi^i\|_1 + \sum_i \frac{1}{m^i} \|\sigma(-|\nabla \phi^i|)\|_1,$$

in the formula, $L_{RegDice}$, $L_{MSE}$, R respectively representing a Dice loss, a mean square error loss, and a regularization loss, $T_m$, $T_f$ representing segmentation labels of the floating image and the reference image, ϕ representing a deformation field, λ and β being respectively coefficients, $$T_m^i \circ \phi^i$$

representing transforming a floating image label $$T_m^i$$

having a resolution of i according to a deformation field $\phi^i$ having a resolution of i via linear interpolation, and σ(•) representing an activation function having a value range of [0, +∞).

5. The building method according to claim 4, wherein the value of λ is 10, and the value of β is 0.1.

6. The building method according to claim 2, wherein the multi-scale self-attention network comprises: an encoding module, and cascaded n groups of decoding modules, encoding and decoding branch feature fusion modules, and self-attention modules, n being the total number of scales corresponding to the multi-scale;

wherein the encoding module is used to perform different scales of encoding on a received three-dimensional image, so as to acquire a feature map $$f_e^1$$

of the same resolution as the input three-dimensional image and n feature maps of different resolutions all lower than the resolution of the feature map $$f_e^1;$$

the cascaded n groups of decoding modules, encoding and decoding branch feature fusion modules, and self-attention modules are used according to the resolutions of encoded feature maps in ascending order, first, the encoding module in the first group is used to perform feature extraction on the feature map of the lowest resolution acquired by means of the encoding and to upsample the same to a corresponding upper level of resolution in the encoding adjacent to the resolution of a current feature extraction result, the encoding and decoding branch feature fusion module fuses the feature map output by the decoding module in the same group and the feature map of the same resolution acquired by means of the encoding, so as to acquire a decoded feature map, and the self-attention module performs self-attention principle calculation on the basis of the decoded feature map and an image having the same resolution as the decoded feature map and acquired by resampling the combined image, so as to acquire a self-attention feature map of the corresponding resolution and a deformation field or a segmentation result of the corresponding resolution; the self-attention feature map is used as an input of the decoding module in the second group of the decoding module, the encoding and decoding branch feature fusion module, and the self-attention module, and the above-described process is repeated until the self-attention module in the n-th group of the decoding module, the encoding and decoding branch feature fusion module, and the self-attention module outputs a deformation field or a segmentation result having the resolution of the original image.

7. The building method according to claim 6, wherein the encoding module comprises a convolutional layer and cascaded n groups of residual convolution modules and convolutional downsampling modules, wherein the convolutional layer is used to perform feature map extraction on a received three-dimensional image to acquire the feature may $$f_e^1;$$

and the cascaded n groups of residual convolution modules and convolutional downsampling modules are respectively used to perform feature extraction and resampling on a feature map output by an upper stage, so as to acquire n feature maps of different resolutions all lower than the resolution of the feature map $$f_e^1;$$

the decoding module comprises a residual convolution module and a convolutional upsampling module, wherein the residual convolution module is used to perform feature extraction on the received three-dimensional image, and the convolutional upsampling module is used to upsample a feature extraction result.

8. The building method according to claim 6, wherein the self-attention module performs the self-attention principle calculation in the following manner:

$$V_o^i = \text{softmax}\left(Q_D^i \times K_I^i \cdot ps^{-3/2}\right) \times V_I^i,$$

$$\hat{f}_D^i = \text{unflatten}\left(V_o^i\right) + f_D^i,$$

$$Y^i = FFN\left(LayerNorm\left(\hat{f}_D^i\right)\right),$$

$$f_c^i = FFN\left(Y^i\right);$$

where in the formula, $$Q_D^i$$

represents a corresponding self-attention component resulting from embedding performed by a fully connected layer on two-dimensional matrix data, the two-dimensional matrix data being acquired by evenly dividing, in the spatial dimension, the decoded feature map $$f_D^i$$

received by the self-attention module and having a resolution of I into a plurality of locally related regions, and by compressing each of the locally related regions into a vector;

$$K_I^i, V_I^i$$

respectively represent corresponding two self-attention components resulting from embedding performed by two different fully connected layers on two-dimensional matrix data, the two-dimensional matrix data being acquired by evenly dividing, in the spatial dimension, an image having a resolution of i and acquired by resampling the combined image received by the self-attention module, and by compressing, into a vector, each of the locally related regions; ps represents an edge length of the locally related region; unflatten represents a dimensional operation function for deconstructing a matrix into image features; LayerNorm(•) represents layer normalization calculation; FFN represents a feedforward neural network, and $$f_c^i$$

represents a self-attention feature map having a resolution of i.

9. A multi-modal three-dimensional medical image segmentation and registration method, characterized in that: a segmentation and registration model built by using the building method according to claim 1 is used to perform the following steps:

acquiring three-dimensional medical images of two modalities of a target, wherein the image of one modality is used as a reference image, and the image of the other modality is used as a floating image;

using a reference image segmentation model in the segmentation and registration model to perform multi-scale segmentation on a target region in the reference image, so as to acquire a multi-scale reference image segmentation result; using a floating image segmentation model in the segmentation and registration model to perform multi-scale segmentation on a target region in the floating image, so as to acquire a multi-scale floating image segmentation result;

inputting the reference image, the floating image, a maximum scale reference image segmentation result, and a maximum scale floating image segmentation result into a registration model in the segmentation and registration model, so as to acquire a multi-scale deformation field; and displacing each pixel point in the floating image on the basis of a maximum-scale deformation field in the multi-scale deformation field, so as to achieve alignment and registration for the reference image and the floating image.

10. A non-transitory computer-readable storage medium, characterized by comprising a stored computer program, wherein when executed by a processor, the computer program controls a device where the storage medium is located to perform the building method of a multi-modal three-dimensional medical image segmentation and registration model according to claim 1.

* * * * *